US 6,352,005 B1

(12) United States Patent
Lin et al.

(10) Patent No.: US 6,352,005 B1
(45) Date of Patent: Mar. 5, 2002

(54) TWO SCREWS DOUBLE-STROKE AND SCREW DIFFERENTIAL-MOTION MECHANISM APPLIED IN STANDARD MECHANICAL INTERFACE

(75) Inventors: Wu-Lang Lin, Tai-jung-shian; Kuei-Jung Chen, Mialo Li; Tzong-Ming Wu, Taipei; Jiann-Cherng Chen, Tainan, all of (TW)

(73) Assignee: Industrial Technology Reseach Institute, Hsinchu (TW)

( * ) Notice: Subject to any disclaimer, the term of this patent is extended or adjusted under 35 U.S.C. 154(b) by 0 days.

(21) Appl. No.: 09/544,564

(22) Filed: Apr. 6, 2000

(51) Int. Cl.⁷ ............................................... F16H 27/02
(52) U.S. Cl. ....................... 74/89.29; 74/89.32; 901/21
(58) Field of Search ............................ 74/89.35, 89.32, 74/89.29; 901/21, 20, 23

(56) References Cited

U.S. PATENT DOCUMENTS

| | | | | |
|---|---|---|---|---|
| 4,682,930 A | * | 7/1987 | Hachisv ....................... 414/589 |
| 5,111,709 A | * | 5/1992 | Torii et al. .................. 74/89.15 |
| 5,319,990 A | * | 6/1994 | Veale et al. ................. 74/89.15 |
| 5,937,699 A | * | 8/1999 | Garrec ........................ 74/89.15 |
| 6,025,689 A | * | 2/2000 | Prentice et al. ............. 318/625 |

* cited by examiner

Primary Examiner—David Fenstermacher
(74) Attorney, Agent, or Firm—Rabin & Berdo, P.C.

(57) ABSTRACT

A two screw double-stroke and screw differential-motion mechanism is applied in a standard mechanical interface. The two mechanisms are utilized for the correlation of transmission between screws and nuts and the screw differential-motion, so as to achieve more efficient positioning and clamp retrieval and placement.

4 Claims, 4 Drawing Sheets

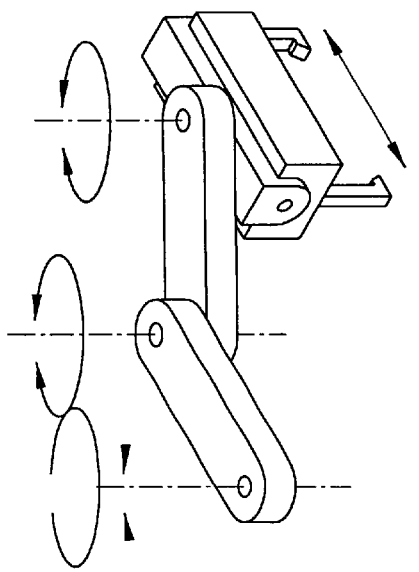
PRIOR ART FIG. 3
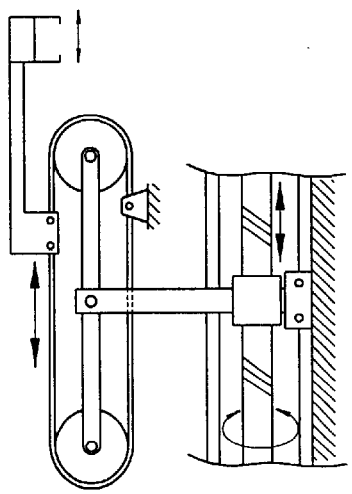
FIG. 4
PRIOR ART
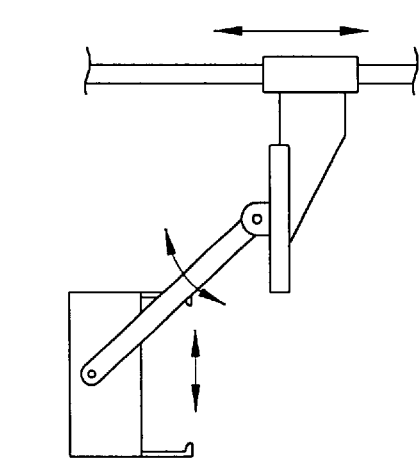
PRIOR ART FIG. 1
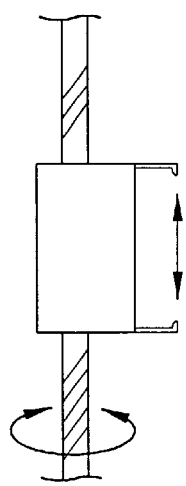
FIG. 2
PRIOR ART

TWO SCREWS DOUBLE-STROKE AND SCREW DIFFERENTIAL-MOTION MECHANISM APPLIED IN STANDARD MECHANICAL INTERFACE

BACKGROUND OF THE INVENTION

1. Field of the Invention

The present invention relates to a two screw double-stroke and screw differential-motion mechanism applied in a standard mechanical interface and, in particular, to one that utilizes the correlation of transmission between screws and nuts and the screw differential-motion so as to achieve double-stroke and differential-motion effects.

2. Description of the Prior Art

Due to spatial limits, expensive maintenance fees for clean rooms, and stringent requirements on cleanness in a semiconductor fab, the concept of a standard mechanical interface (SMIF) and machine design has been established and developed to classify clean rooms of different levels that machines or operators can access so as to decrease the chance of particle pollution, to increase the cleanness of clean rooms, to lower maintenance fees, and to increase IC wafer yield. In particular, the design of an SMIF arm appears more important. When the SMIF arm is combined with process equipment, the transmission arm has to move forward to the process equipment and grasp a cassette with a clamp. When the arm returns, it should go back to the center of the process equipment. Therefore, the clamp has to travel about twice the distance that the screw can proceed. Furthermore, there is a higher demand for cleanness in current IC wafer process environments.

With clamps, the heavier the clamp is, the more vibration there is in mechanical motions. Furthermore, the more motion links there are, the more likely there will be particle production and machine wiggles. Some conventional SMIF arm designs make use of an elbow-arm mechanism and complete the retrieval and placement of a cassette using clamp motion along the z-axis (e.g. the ASIST's design). Some have a linkless air pressurized cylinder mechanism installed on the inner side of the machine to drive the clamp back and forth for retrieving and placing the cassette (e.g. the INFAB's design). Or a set of mechanical arms may be mounted above the machine with extension and flexion mechanisms to achieve the retrieval and placement of a cassette (e.g. the FORTREND's design). Alternatively, a single screw may be installed on the inner side of the machine to obtain, in conjunction with a timing belt pulley, a double-stroke clamp for the retrieval and placement of a cassette (e.g. the one by Industrial Technology Research Institute, Mechanical Industry Research Laboratories). However, the above-mentioned mechanisms are either so complicated that more friction exists in machine operations and more waste particles are produced, or too expensive in production and maintenance costs.

In view of the foregoing, it is highly desirable to have a mechanism that can prevent waste particle production, effectively isolate the particles, and simplify the design of the machine.

SUMMARY OF THE INVENTION

It is an object of the present invention to provide a two screw double-stroke and screw differential-motion mechanism applied in a standard mechanical interface. The two screw double-stroke mechanism adopts a two screw connection mechanism to achieve the goal of double strokes; therefore the longitudinal depth of the machine can be decreased by about ½. Thus, the space require by the machine is greatly reduced. Compared with current products on the market, the present invention has a smaller size, stronger mechanism rigidity, longer stroke, and smaller space occupied by the arm.

It is another object of the present invention to provide a two screw double-stroke and screw differential-motion mechanism applied in a standard mechanical interface, whose two screws double-stroke mechanism uses an outer cover to enclose the transmission mechanism of the SMIF arm so as to greatly reduce particle production and diffusion.

It is yet another object of the present invention to provide a two screw double-stroke and screw differential-motion mechanism applied in a standard mechanical interface, whose two screw double-stroke mechanism has an optimized design between the linear tracks and screws so that by mutual support, fixture, and sliding the rigidity of the motional elements can be greatly increased and fewer vibrations would happen to the end of the retrieval mechanism.

It is a fourth object of the present invention to provide a two screw double-stroke and screw differential-motion mechanism applied in a standard mechanical interface, wherein due to the transmission consistency of the transmission axle the screw differential-motion mechanism can diminish the probability of clamp retrieval errors.

It is a fifth object of the present invention to provide a two screw double-stroke and screw differential-motion mechanism applied in a standard mechanical interface, wherein the screw differential-motion mechanism has such a simple structure that the weight of the end-point clamp and the complexity of the mechanism can be greatly decreased and thus the invention can reduce the vibrations and inertia of the mechanism.

It is a further object of the present invention to provide a two screw double-stroke and screw differential-motion mechanism applied in a standard mechanical interface, wherein components of the screw differential-motion mechanism have less contact that there is less production of waste particles due to friction.

The two screw double-stroke and screw differential-motion mechanism applied in a standard mechanical interface with the above features comprises:

a two screw double-stroke mechanism, whose inside is a fixed substrate mounted with a guide rack, the contact surface of said guide rack and said fixed substrate being provided with a set of linear track; a driving motor, which is mounted inside said guide rack and drives through a timing belt a power transmission timing belt pulley fixed within said guide rack, said power transmission timing belt being installed on a ball screw nut and combined with said guide rack using angular contact ball bearings; an end-point timing belt pulley, which is mounted on the side of a screw opposite to a screw nut and drives said screw into rotation with the power transmitted from said power transmission timing belt pulley, said screw nut performing horizontal sliding at the same time; and a screw differential-motion mechanism, which is provided above said screw nut and comprises a driving motor for driving a differential screw with a left thread and a right thread on both ends, each end of said differential screw having therein a clamp means containing a female thread fitting with both ends of said differential screw, two sets of linear tracks at the bottom of said clamp means, and a hook on each side of said screw differential-motion mechanism for horizontal motion in conjunction with said clamp means.

BRIEF DESCRIPTION OF THE DRAWINGS

The drawings disclose an illustrative embodiment of the present invention which serves to exemplify the various advantages and objects hereof, and are as follows:

FIG. 1 shows a conventional retrieval and placement mechanism using an elbow-arm mechanism applied in a standard mechanical interface;

FIG. 2 shows a conventional retrieval and placement mechanism using a linkless air pressurized cylinder mechanism applied in a standard mechanical interface;

FIG. 3 shows a conventional retrieval and placement mechanism using a mechanical arm mechanism applied in a standard mechanical interface;

FIG. 4 shows a conventional retrieval and placement mechanism using a screw and timing belt mechanism applied in a standard mechanical interface;

DETAILED DESCRIPTION OF THE PREFERRED EMBODIMENT

Figure 6:
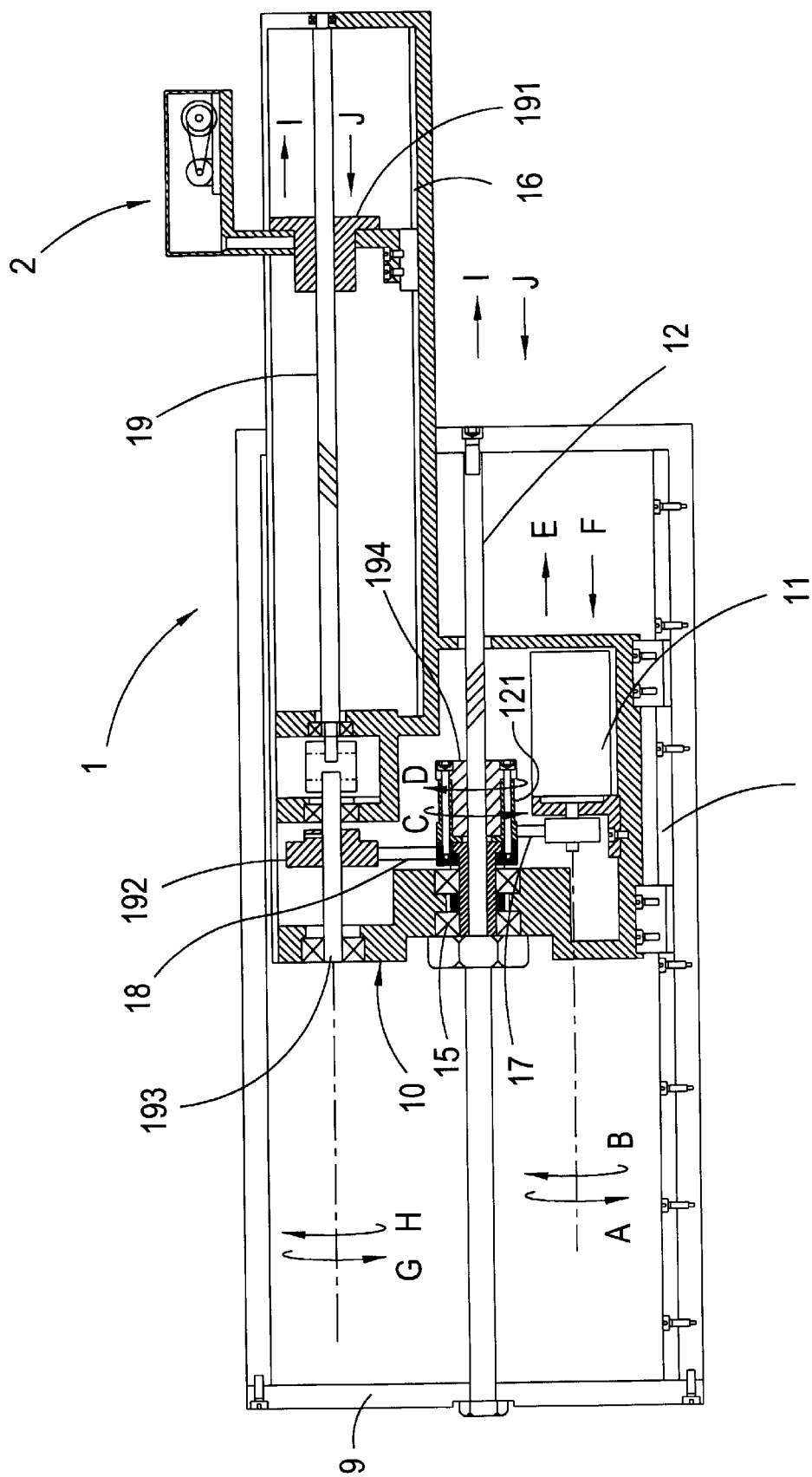
FIG. 6 is a front cross-sectional view of a two screw double-stroke and screw differential-motion mechanism applied to a standard mechanical interface according to the present invention.

Please refer to FIG. 6, which is a front cross-sectional view of a two screw double-stroke and screw differential-motion mechanism applied to a standard mechanical interface according to the present invention. A guide rack 10 is provided within a two screw double-stroke mechanism 1, which includes a fixed substrate 9 that houses the other components of the two screw double-stroke mechanism. A set of linear tracks 13 is provided on the contact surface of the guide rack 10 and the interior of the fixed substrate. A driving motor 11 is mounted within the guide rack 10 to drive into operation a power transmission timing belt pulley 121 mounted on a screw nut 194 within the guide rack 10 through a belt 17. The screw nut 194 accommodates a ball screw 12, which in turn fits into angular contact ball bearings 15 installed on the guide rack 10. When the power transmission timing belt pulley 121 is driven into motion, the power is further transmitted to an end-point timing belt pulley 192 mounted within the guide rack 10 through a belt 18. The end-point timing belt pulley 192 is fixed on a transmission axle 193 provided within the guide rack 10 and connected to a screw 19 and an accompanying screw nut 191. A set of linear tracks 16 is provided between the screw nut 191 and the substrate 9 for the screw nut 191 to slide.

When the driving motor 11 rotates in A direction, through the power transmission by the belt 17, the power transmission timing belt pulley 121 rotates in direction C. Since the power transmission timing belt pulley 121 is engaged on the ball screw 12, which is mounted on the fixed substrate 9, by its thread, the guide rack 10 moves horizontally in direction E as the power transmission timing belt pulley 121 rotates.

The power transmission timing belt pulley 121 driven by the belt 18 also drives the belt 18, which in turn drives the end-point timing belt pulley 192 to rotate in direction G. As the end-point timing belt pulley 192 rotates, the transmission axle 193 and the screw 19 also rotate in direction G. Since the screw nut 191 is engaged on the screw 19 by its thread, the screw nut 191 moves horizontally in the direction I as the screw 19 rotates in direction G, so that the extension part of the guide rack 10 extends by doubling the stroke. When the driving motor 11 rotates in direction B, through the power transmission by the belt 17, the power transmission timing belt pulley 121 rotates in direction D. Since the power transmission timing belt pulley 121 is engaged on the ball screw 12, which is mounted on the fixed substrate 9, by its thread, the guide rack 10 moves horizontally in direction F as the power transmission timing belt pulley 121 rotates. The power transmission timing belt pulley 121 driven by the belt 19 also drives the belt 18, which in turn drives the end-point timing belt pulley 192 to rotate in direction H. As the end-point timing belt pulley 192 rotates, the transmission axle 193 and the screw 19 also rotate in direction H. Since the screw nut 191 is engaged on the screw 19 by its thread, the screw nut 191 moves horizontally in direction I as the screw 19 rotates in direction H so that the extension part of the guide rack 10 retreats by doubling the stroke.

Figure 7:
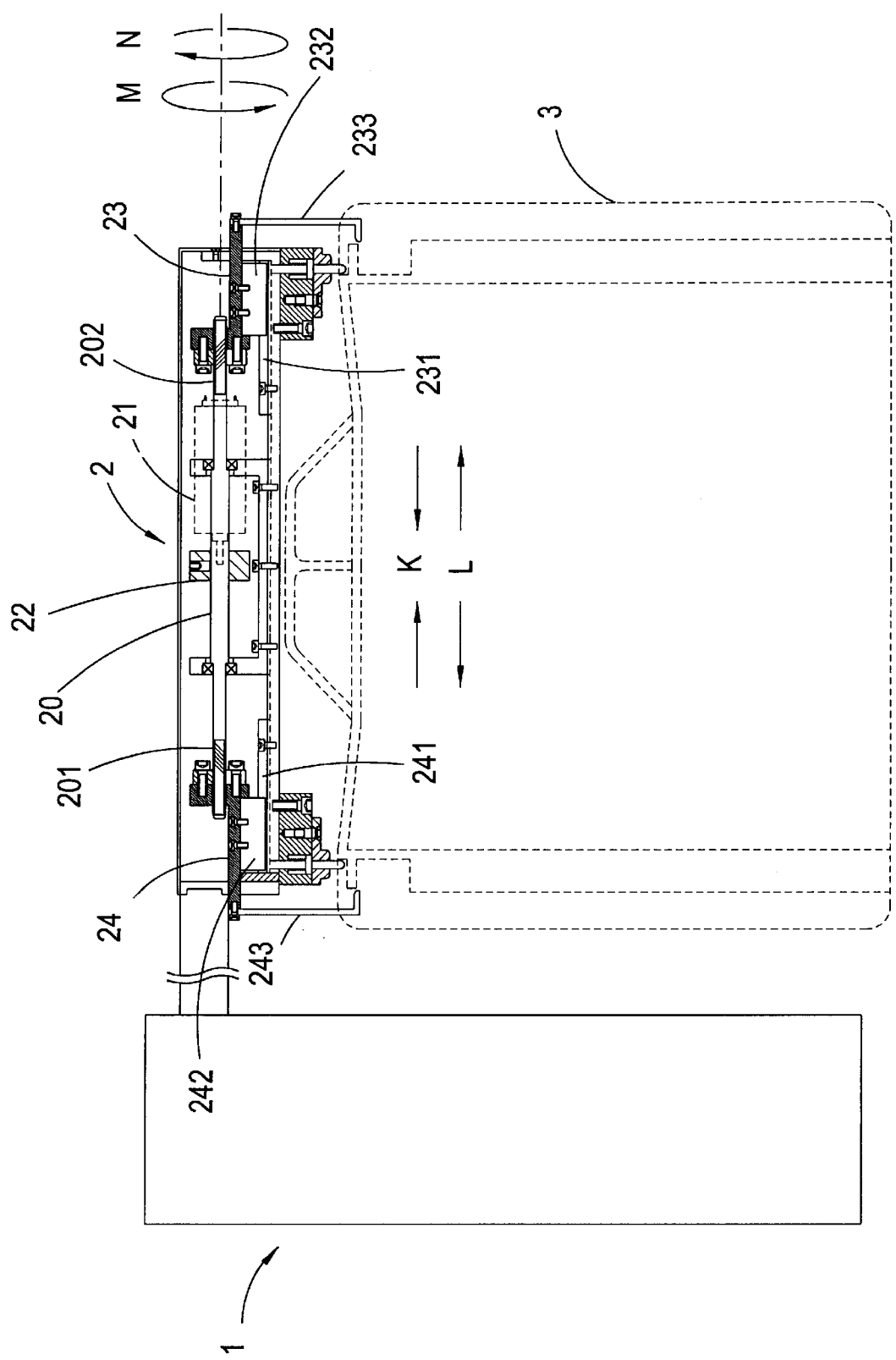
FIG. 7 is a side cross-sectional view of the screw differential-motion mechanism in a two screw double-stroke and screw differential-motion mechanism applied to a standard mechanical interface according to the present invention.

Please refer to FIG. 7, which is a side cross-sectional view of the screw differential-motion mechanism in a two screws double-stroke and screw differential-motion mechanism applied to a standard mechanical interface according to the present invention. A screw differential-motion mechanism 2 is mounted on the side opposite to the screw nut 191 on the linear track 13 in the two screw double-stroke mechanism 1. The screw differential-motion mechanism 2 contains another driving motor 21, which drives a differential-motion screw 20 with a left hand thread and a right hand thread on both ends, respectively. Both ends of the differential-motion screw 20 are provided with clamp means 23, 24 having respective female threads to engage the left hand thread and the right hand thread. The clamp means 23, 24 have two sets of linear tracks 231, 241 on the bottom, respectively. A hook 233 and a hook 243 are connected on the ends of the clamp means 233 and 243 outside the screw differential-motion mechanism 2. The two hooks 233 and 243 can move horizontally with the clamp means 23, 24. When the driving motor 21 drives the differential-motion screw 20 to rotate in direction M, the clamp means 23, 24 can drive the hooks 233, 243 to move in direction K at the same time, for the differential-motion screw 20 has different thread chiralities on both ends. On the other hand, when the driving motor 21 drives the differential-motion screw 20 to rotate in direction N, the clamp means 23, 24 can drive the hooks 233, 243 to move in direction L at the same time, for the differential-motion screw 20 has different thread chiralities (mirror images) on both ends. With the combination of the two screw double-stroke mechanism 1 and the screw differential-motion mechanism 2 of the present invention, fast positioning and object retrieval and placement can be achieved.

Figure 5:
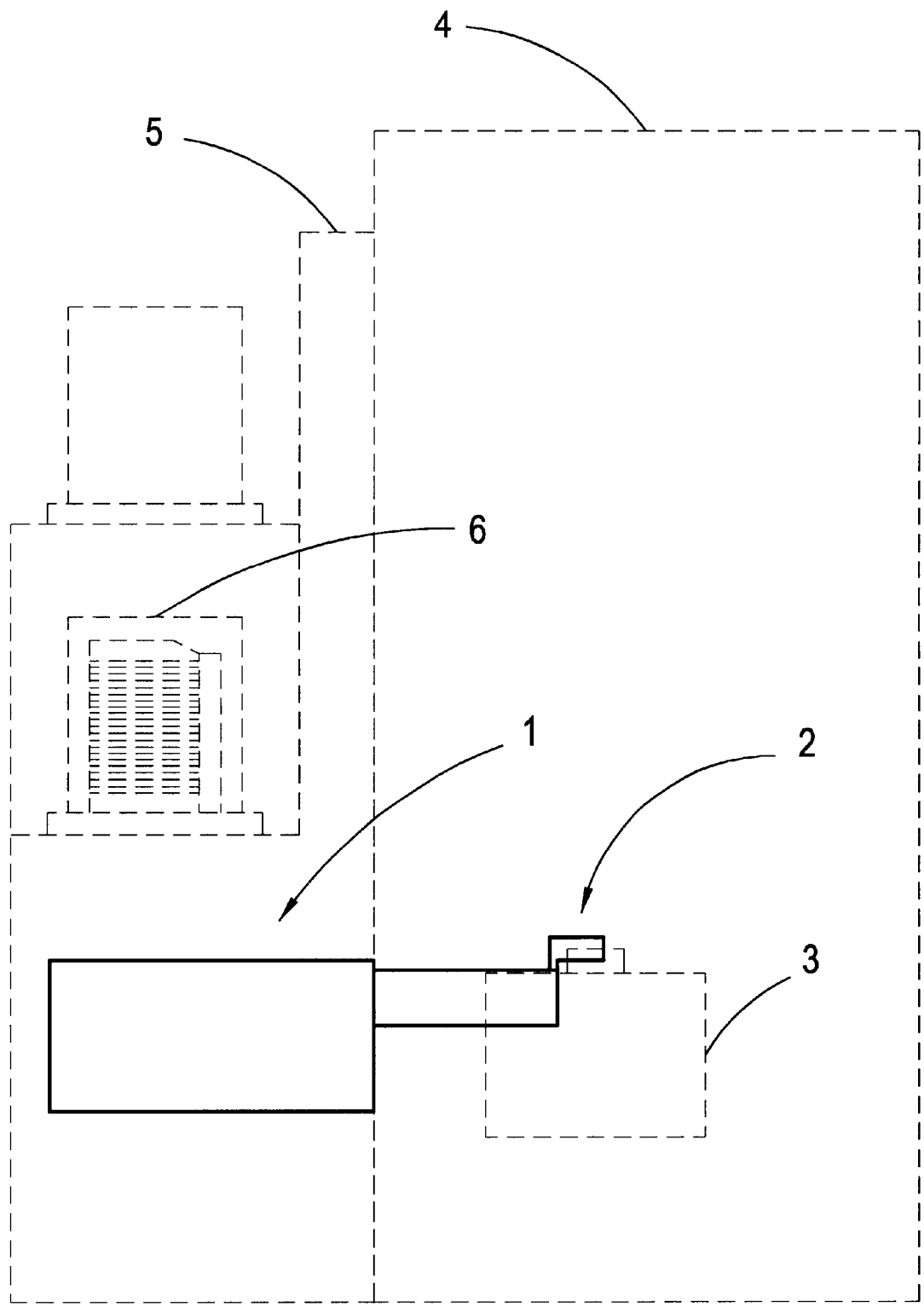
FIG. 5 shows an embodiment of a two screw double-stroke and screw differential-motion mechanism applied in a standard mechanical interface according to the present invention.

Please refer to FIG. 5, which shows an embodiment of a two screw double-stroke and screw differential-motion mechanism applied in a standard mechanical interface according to the present invention. After combining the two screw double-stroke mechanism 1 and the screw differential-motion mechanism 2, and mounting them on a standard mechanical interface (SMIF) 5 on a unit process machine 4, the two screw double-stroke mechanism 1 can send a mechanical arm of the screw differential-motion mechanism 2 in a double-stroke way into the unit process machine 4 to perform retrieval and placement of a cassette 3. From FIG. 5, one can understand the operation of applying the two screw double-stroke mechanism 1 and the screw differential-motion mechanism 2 of the present invention in a machine.

When compared with the aforementioned references and other prior arts, the two screw double-stroke and screw differential-motion mechanism applied in a standard mechanical interface of the present invention has the following advantages:

1. A two screw connection mechanism is employed to achieve the goal of double strokes; therefore the longitudinal depth of the machine can be decreased by about ½. So the space required by the machine is greatly reduced. Furthermore, an outer cover to enclose the transmission mechanism of the SMIF arm can be used in chip wafer production so as to greatly reduce particle production and diffusion and to increase the chip wafer yield.
2. An optimized design is adopted between the linear tracks and screws so that by mutual support, fixture, and sliding, the rigidity of the motional elements can be greatly increased and fewer vibrations would happen to the end of the clamps.
3. Compared with current products on the market, the present invention has a smaller size, stronger mechanism rigidity, longer stroke, and smaller space requirements for the arm.
4. By the differential motion of the left hand and right hand threads on both ends of a single screw, the clamps have a consistent correlation in clamping and releasing, which can diminish the probability of errors. This mechanism has such a simple structure that the weight of the end-point clamp and the complexity of the mechanism can be greatly decreased and thus the invention can reduce the vibrations and inertia of the mechanism. Devices in this mechanism have less contact, so there is less particle production due to friction.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. In combination:
    a two screw double-stroke mechanism, including:
        a fixed substrate;
        a plurality of linear tracks provided on said fixed substrate;
        a guide rack mounted on said fixed substrate, and being adapted to slide on said linear tracks;
        a first screw attached to said fixed substrate;
        a first screw nut threadably disposed on said first screw;
        a power transmission timing belt pulley mounted on said first screw nut;
        a first driving motor mounted inside said guide rack;
        a timing belt in engagement with said first driving motor and being in engagement with said power transmission timing belt pulley;
        a second screw attached to said guide rack;
        a second screw nut threadably disposed on said second screw; and
        an end point timing belt pulley adapted to rotatably drive said second screw, and being coupled to said power transmission timing belt pulley, wherein when said first driving motor is operated, said first driving motor causes said power transmission timing belt pulley and said first screw nut to rotate relative to said first screw, thereby causing said guide rack to slide on said linear tracks, said first driving motor further causing said end point timing belt pulley and said second screw to rotate, thereby moving said second screw nut in a linear direction; and
    a screw differential-motion mechanism connected to said second screw nut and moving therewith, including:
        a second driving motor;
        a differential screw connected to said second driving motor, and having a left hand thread at one end, and a right hand thread at another end, said differential screw being rotatably driven by said second driving motor;
        a first clamp having a female thread that engages the left hand thread, and a second clamp having a female thread that engages the right hand thread;
        a plurality of further linear tracks, said first clamp and said second clamp being slidably disposed on said further linear tracks; and
        a first hook connected to said first clamp, and a second hook connected to said second clamp; wherein when said second driving motor is operated, said second driving motor causes said differential screw to rotate, thereby causing said clamps to slide upon said further linear tracks, and causing said hooks to move with said clamps.

2. The combination recited in claim 1, wherein said first screw comprises a ball screw, and wherein said first screw nut comprises a ball screw nut.

3. The combination recited in claim 1, wherein said two screw double-stroke mechanism further comprises a bearing connected to said guide rack for rotatably supporting said first screw nut.

4. The combination recited in claim 1, wherein said first screw and said second screw have opposite threads.

* * * * *